(12) United States Patent
Wright et al.

(10) Patent No.: US 10,040,004 B2
(45) Date of Patent: Aug. 7, 2018

(54) METHOD FOR MIXING INDUSTRIAL WASTE WATER WITHIN A GRAVITY SETTLING TANK

(71) Applicant: ClearCove Systems, Inc., Victor, NY (US)

(72) Inventors: Terry Wright, Rochester, NY (US); Kimberly A. Miller, Oneonta, NY (US); Timothy D. McCrossen, Rochester, NY (US)

(73) Assignee: ClearCove Systems, Inc., Victor, NY (US)

( * ) Notice: Subject to any disclaimer, the term of this patent is extended or adjusted under 35 U.S.C. 154(b) by 239 days.

(21) Appl. No.: 14/851,125

(22) Filed: Sep. 11, 2015

(65) Prior Publication Data

US 2016/0090312 A1 Mar. 31, 2016

Related U.S. Application Data

(60) Provisional application No. 62/055,061, filed on Sep. 25, 2014.

(51) Int. Cl.
*B01D 21/24* (2006.01)
*B01D 21/00* (2006.01)
*C02F 1/00* (2006.01)
*C02F 1/52* (2006.01)
(Continued)

(52) U.S. Cl.
CPC ..... *B01D 21/0087* (2013.01); *B01D 21/2405* (2013.01); *B01D 21/2427* (2013.01); *C02F 1/006* (2013.01); *C02F 1/52* (2013.01); *C02F 1/66* (2013.01); *C02F 2001/007* (2013.01); *C02F 2001/5218* (2013.01);
(Continued)

(58) Field of Classification Search
CPC ............ B01D 21/2427; B01D 21/0018; B01D 21/0087; B01D 21/02; B01D 21/2405; B01D 21/2416; B01D 21/2422; B01D 21/0039; B01D 21/245; B01D 21/2411; C02F 2209/10; C02F 1/006; B01F 5/0602
See application file for complete search history.

(56) References Cited

U.S. PATENT DOCUMENTS 2,098,467 A 11/1937 Sayers
3,208,834 A * 9/1965 Schulze ............... B01D 9/0031
159/45

(Continued)

*Primary Examiner* — Pranav N Patel
(74) *Attorney, Agent, or Firm* — Harris Beach PLLC; Neal L. Slifkin

(57) ABSTRACT

A method for static mixing in a waste water settling tank to increase the percentage of recovery of entrained solids from the waste water comprising a settling tank having a hopper bottom defining a sludge hopper, a deflector dome centrally disposed within the space contained in the hopper bottom, and an inlet pipe for introduction of waste water containing second entrained solids into the settling tank and having a discharge outlet in proximity to the underside of the deflector dome. Influent waste water is directed vertically upward into the center of the deflector dome which distributes the influent radially into contact, preferably turbulent, with previously introduced waste water containing first entrained solids to cause coalescence of the first and second entrained solids to form larger particles having increased settling velocity.

13 Claims, 2 Drawing Sheets

(51) Int. Cl.
*C02F 1/66* (2006.01)
*C02F 103/32* (2006.01)

(52) U.S. Cl.
CPC ...... *C02F 2103/32* (2013.01); *C02F 2209/06* (2013.01); *C02F 2209/08* (2013.01); *C02F 2209/10* (2013.01)

(56) References Cited

U.S. PATENT DOCUMENTS

| | | | | |
|---|---|---|---|---|
| 4,035,284 | A | * | 7/1977 | Gross .................. B01J 8/26 208/113 |
| 4,832,854 | A | | 5/1989 | Keeter |
| 5,076,915 | A | | 12/1991 | Rose |
| 5,346,631 | A | | 9/1994 | Terry |
| 5,505,860 | A | | 4/1996 | Sager |
| 5,833,865 | A | * | 11/1998 | Harato ............... B01D 21/01 210/207 |
| 5,928,492 | A | | 7/1999 | Corlett et al. |
| 6,334,952 | B1 | | 1/2002 | Hayakawa et al. |
| 2011/0100931 | A1 | * | 5/2011 | Lake .............. B01D 21/0018 210/800 |
| 2012/0248036 | A1 | | 10/2012 | Schaller |

* cited by examiner

METHOD FOR MIXING INDUSTRIAL WASTE WATER WITHIN A GRAVITY SETTLING TANK

RELATIONSHIP TO OTHER APPLICATIONS AND PATENTS

The present invention claims priority from pending U.S. Provisional patent application, Ser. No. 62/055,061, filed Sep. 25, 2014, titled "System for Treating Industrial Waste Water", the disclosure of which is incorporated herein by reference in its entirety.

BACKGROUND OF THE INVENTION

The present invention relates to systems for processing waste water; more particularly, to such systems for handling biologically digestible materials in waste water generated typically in foods and potables manufacturing and serving, e.g., bakeries, breweries, dairies, restaurants, wineries, and the like; and most particularly, to a simple, small volume system for settling solids and adjusting pH in food process waste water to meet waste water quality standards for discharge into a municipal sewage system, including a method for static mixing in an industrial waste water settling tank to increase the percentage of recovery of entrained solids from the waste water.

As used herein, the term "food materials" should be taken to mean any and all biologically digestible organic materials, without limit; the term "food process waste water" should be taken to mean excess water and by-products, components beyond just water itself, used in the manufacture and/or use of food materials, which water must be treated to remove a portion of the dissolved and/or suspended food materials before being either sent to a waste water treatment facility, otherwise discharged to the environment, or hauled away for offsite handling.

Foods and potables manufacturing and handling typically require large volumes of input process water and generate substantial levels of biologically digestible materials dissolved and suspended in their resultant waste process water. Additionally, the pH of such waste water may be substantially acidic or alkaline. When directed without pre-treatment to municipal wastewater treatment facilities, such waste water can place a heavy and costly load on municipal waste treatment facilities. As a result, many communities impose a substantial cost on companies that generate such waste waters in the course of their operations. It is known to monitor the level of food materials in waste water output of companies and to levy a sewer surcharge on the companies accordingly. Many of these companies, for example, "microbreweries", are relatively small in capitalization and output and thus are in need of a relatively inexpensive method and associated apparatus for pre-treating of process waste water to remove a substantial percentage of suspended food materials therefrom before the process waste water is discharged to a municipal sewer system. Fortuitously, the total volume of process waste water generated by many such operations is relatively small, on the order of 1000 gallons/day or less, and therefore is amenable to treatment by a method and apparatus in accordance with the present invention. Larger scale operations can also be supported by scaling up with multiple modules of the present invention.

Note: "Biological Oxygen Demand" (BOD), also known as Biochemical Oxygen Demand and as used herein, is the amount of oxygen needed by aerobic microorganisms to decompose all the organic matter in a sample of water; it is used in the eco-sciences as a measure of organic pollution. As used herein, the term "BOD" also means more generally the unit volume load, both dissolved and suspended, of such organic material in waste water.

Further, Total Suspended Solids (TSS) is a water quality measurement which, as used herein, is expressed as the unit volume load of suspended solids, both organic and inorganic, in water. It is listed as a conventional pollutant in the U.S. Clean Water Act.

EXAMPLE

The following example is directed to the characteristics and treatment of waste water generated by breweries. It should be understood that the disclosed method and apparatus are also well-suited to similar usage in many other types of industrial and agricultural manufacturing and use as noted above.

Breweries have unique effluent characteristics and specific treatment needs. Breweries typically have Biological Oxygen Demand (BOD) levels of 2,000-4,000 mg/l and Total Suspended Solids (TSS) levels of 2,500-3,500 mg/l. These solids have higher densities than water and readily settle out, and much of the dissolved organic load can also be precipitated out by dosing the waste water with coagulants or flocculants. Brewery effluent can typically have a pH range of 2 to 13, depending on what process is taking place in the brewery. The pH may have to be adjusted on occasion to meet municipal requirements and also be bought into optimum range for effective chemical treatment. Brewery effluent can have fluctuating levels of BOD, TSS and pH. There is also a chance that occasionally the brewery may have to waste a batch of beer, discharging the batch and introducing high levels of BOD into a municipal system.

Brewery waste water comprises several contributors to the total BOD and TSS load. Most of these are organic in nature and pose no serious threat to public health.

Yeast, spent grain, and hops are the building blocks of beer. Most of the wastes from these components typically are side streamed in the brewery and diverted as feed for farm animals. Inevitably, some of that waste also will be flushed into the drain and thereby raise the BOD and TSS levels of the process effluent.

Wort is the liquid that will become beer once the yeast is added. Wort comprises fermentable and unfermentable sugars as well as starches and proteins. Because wort is rich in dissolved sugar, it is the primary contributor of BOD and SBOD (soluble BOD).

Fermented beer left in tanks after transfers and lost during packaging also contributes to the BOD and SBOD of the effluent leaving the brewery.

Beer has a characteristically low pH (typically 4-5.5) that can reduce the overall pH of the waste water.

For cleaning chemicals, breweries typically rely on caustic solutions for removing organic deposits from their process tanks. Acid is used on occasion, as are iodine-based sanitizers and peracetic acid for sanitizing tanks and equipment. These are diluted when used, but will still affect the pH of the final effluent.

Most of the water used by breweries leaves in the form of finished beer, so daily waste water flows are relatively low and comprise mostly cleaning water. A typical microbrewery may generate no more than about 200-300 gallons of process waste water per day, although naturally that volume will grow as production volumes increase.

Typical prior art waste water treatment systems are intended for continuous flow of waste water. However, many manufacturing processes are operated intermittently, e.g., on a day-night cycle, wherein there is little or no flow for significant periods of time. Such a cycle affords an opportunity for a gravity settling apparatus for removing non-floating solids from a waste water stream.

What is needed is an improved method for removing biologically-digestible solids from food process waste water to improve waste water quality for discharging into a municipal sewage system.

What is further needed is a method for increasing the percentage of removal of biologically-digestible materials.

SUMMARY OF THE INVENTION

Current waste water treatment systems maintain a continuous flow of influent entering a clarification tank. Effluent exits the clarification tank for secondary treatment. As disclosed in U.S. Pat. No. 7,972,505, "Primary Equalization Settling Tank", U.S. Pat. No. 8,225,942, "Self-Cleaning Influent Feed System for a Waste Water Treatment Plant", U.S. Pat. No. 8,398,864, "Screened Decanter Assembly", pending U.S. patent application Ser. No. 14/141,297, "Method and Apparatus for a Vertical Lift Decanter System in a Water Treatment Systems", U.S. patent application Ser. No. 14/142,099, "Floatables and Scum Removal Apparatus", U.S. patent application Ser. No. 14/325,421, "IFS and Grit Box for Water Clarification Systems" and U.S. patent application Ser. No. 14/471,247 "Method and Apparatus for Using Air Scouring of a Screen in a Water Treatment Facility", the inventor has developed systems and processes for primary clarification of the waste water. The above named applications and patents are incorporated herein by reference in their entirety for all purposes.

An improved apparatus and method to treat industrial waste water is now described in more detail.

In accordance with apparatus and method of the present invention, an EPT waste water treatment system includes a sludge hopper in a lower portion of a clarification, or settling, tank with an outlet for the sludge. A decanter is provided within the clarification tank and has an outlet for waste water that passes through the decanter. The decanter is at an elevation higher than the sludge hopper and may be equipped to follow vertical changes in the upper surface of waste water within the clarification tank. The system includes a pump for supplying waste water influent, apparatus for dosing the influent, flow control apparatus, and an influent pipe for delivering waste water influent fluid from the pump into the clarification tank. The influent pipe is at an elevation above the sludge outlet and below the decanter. A fluid deflector, preferably dome-shaped, is provided such that the influent pipe directs waste water influent against the underside of the fluid deflector to create mixing of incoming influent with influent and settled solids already in the clarification tank.

In operation, in a currently preferred embodiment of the invention, the operating cycle for the EPT includes mixing the BOD-rich influent with "seeded" BOD solids that are purposely retained in the sludge hopper from the previous cycle as the clarification tank is emptied. The retained BOD sludge solids typically take the form of a loose concentration of particles of various sizes and shapes in a layer on the bottom of the tank. Through turbulent agitation this layer may be dispersed and re-suspended into the mixing zone below the dome-shaped deflector. Coalescence of BOD particles occurs in the sludge hopper during mixing with influent because influent BOD particles adhere to, and add to, the suspended BOD "seeded" particles when they collide.

Subsequently, after the tank is full and influent flow is terminated, there is a settling period as the coalesced BOD settles to re-form the sludge layer in the hopper section of the EPT. When the settling period is complete, most but not all of the settled BOD sludge is drained from the hopper, leaving some of the sludge layer as "seeding" for the next cycle, while the relative clean water in the elevated clarification section of the EPT is drawn off via the vertically-mobile decanter.

In the present invention, mixing desirably is sufficient only to keep the sludge layer dispersed and re-suspended into the mixing zone below the dome. The velocity of influent fluid exiting the influent pipe is too high to permit settling of small BOD particles and therefore requires rapid attenuation. The dome-shaped fluid deflector permits relatively high influent volumes and velocities to enter the tank by simultaneously attenuating the influent velocity to a desired lower level and turning the influent flow outward and downward on a velocity vector shown experimentally to provide adequate mixing while still allowing settling of BOD in influent to continue above the deflector.

In keeping with a design ideal of simplicity and inexpensive fabrication of an EPT system, mixing in accordance with the present invention occurs as a result of the static arrangement of system components, without dynamic mixing. Thus, by controllably and optimally agitating the sludge layer, such static mixing of incoming BOD particles with existing sludge is an important element and discovery in accordance with the present invention.

Further features and advantages of the present invention will become apparent to those of ordinary skill in the art in view of the drawings and detailed description of preferred embodiments below.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
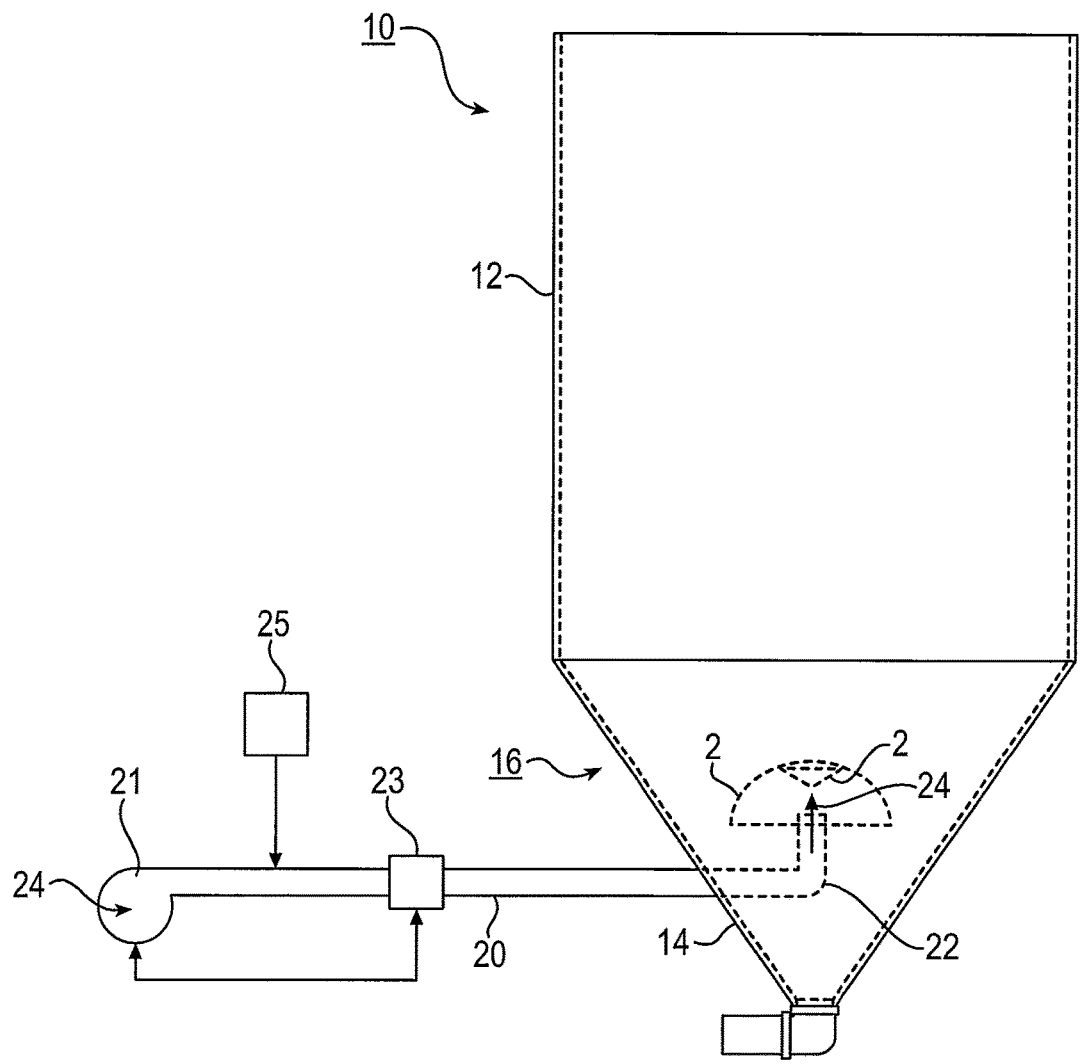
FIG. 1 is an elevational cross-sectional view of a portion of an EPT waste water gravity settling system in accordance with the present invention.
Figure 2:
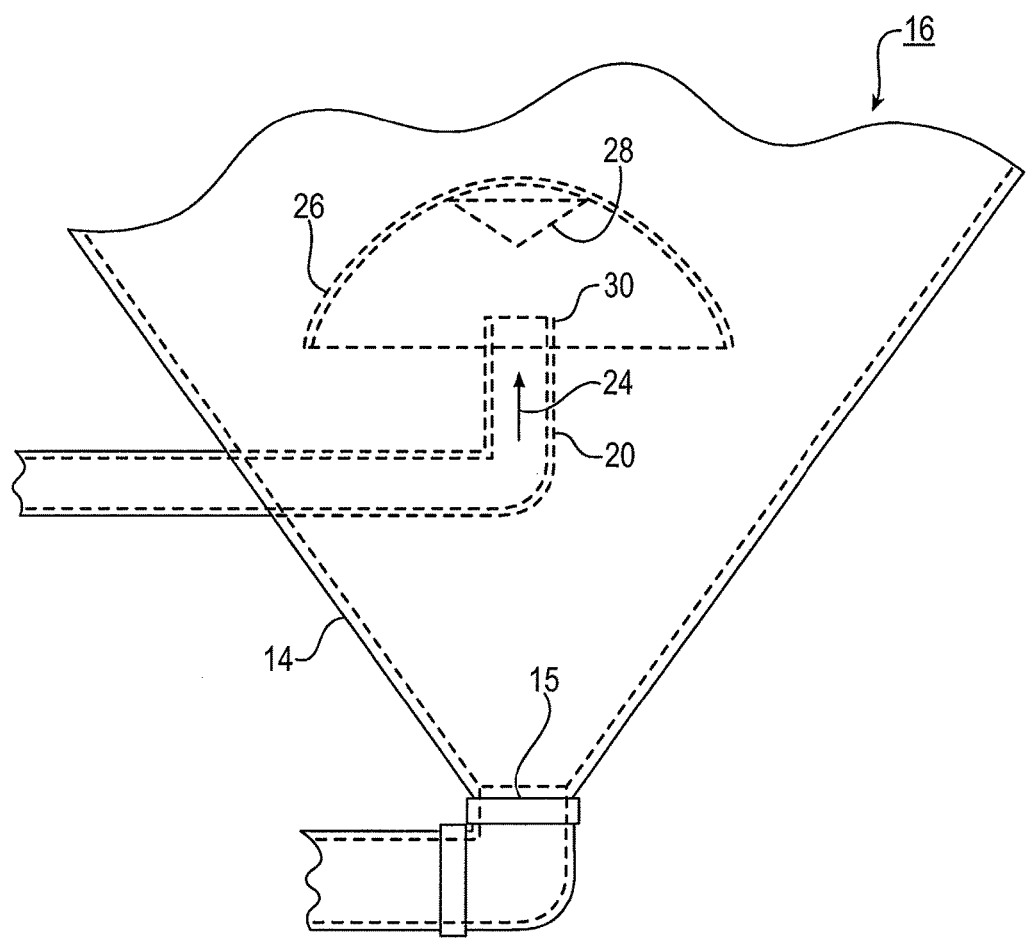
FIG. 2 is an enlarged view of the lower portion of the system shown in FIG. 1.

Referring now to FIGS. 1 and 2, a system 10 for static mixing in an industrial waste water settling tank to improve the recovery of non-floating solids therefrom comprises a tank 12 provided with a sludge hopper 14 in a bottom portion 16 of tank 12 (not to scale). In a currently preferred embodiment, tank 12 is cylindrical and sludge hopper 14 is conical. A waste water influent pipe 20 carries waste water and solids into tank 12. The flow of waste water influent is provided by a pump 21 and is controlled by flow control apparatus 23 which may include a flow meter and control valving (not shown) in known fashion. Further, dosing apparatus 25 may be provided for, e.g., adjusting pH of the influent or adding coagulants and/or flocculants thereto.

Preferably, waste water influent pipe 20 comprises an elbow 22 as needed such that waste water and solids 24 are discharged vertically against a fluid deflector assembly 26. Preferably, fluid deflector assembly 26 comprises a dome provided preferably with an inverted distribution cone 28 on its underside, as shown in FIGS. 1 and 2; however, within the scope of the present invention, a fluid deflector or fluid deflector assembly may take the form of any of various shapes, with or without cone 28, as may be dictated by a particular application. Preferably, deflector assembly 26 is centrally disposed within the space enclosed by sludge hopper 14.

As described above, the operating cycle for the EPT includes static mixing of the BOD-rich influent with "seeded" BOD sludge remaining in the sludge hopper from the previous cycle. Preferably, the sludge layer comprises significant amounts of flocculants and/or coagulants that assist in coalescing the influent BOD particles with the "seeded" BOD.

In operation, fluid deflector assembly 26 slows the influent flow velocity of waste water 24 and redirects it generally outward and downward in a circular pattern toward the walls of sludge hopper 14 to facilitate the mixing and settling of solids out of the waste water. As the fluid level in tank 12 rises and solids begin to settle out of the waste water in sludge hopper 14, coalescence occurs during mixing of influent 24 with material already in sludge hopper 14 because BOD particles tend to coalesce with the "seeded" BOD particles suspended by turbulent agitation from the influent flow. Subsequently, during a quiescent settling period after influent flow is terminated, the BOD coalescent sinks into the hopper section of the EPT. When the settling period is complete, most of the settled BOD is drained from the hopper, leaving some BOD as "seeds" for the next cycle, while the relatively clean water in the elevated clarification section of the EPT is drawn off via the decanter (not shown).

It is an important feature of the present invention that the separation percentage of BOD particles in influent waste water entering the tank is increased by a method that impinges such particles on other BOD materials such as but not limited to BOD particles already present therein, causing coalescence thereof into larger particles having greater settling tendency to form a new layer of BOD materials. In the present invention, such impingement is conferred by controlling the influent flow, rate in combination with the arrangement of fixed deflector and tank components.

System 10 has been modeled using computer simulation to identify the critical parameters of the design and to establish optimum values for mixing. The simulation indicates that the dome and inverted cone assembly provides the most effective mixing geometry.

Calculations were performed on a system 12 having the following dimensions:
Dome diameter: 15 inches
Dome height: 6 inches
Cylindrical EPT tank inside diameter: 48 inches
Inverted cone within the dome: 5-inch width and 1.5-inch height.

The included cone angle at the bottom of sludge hopper 14 was 60°. The lower rim of the dome was located approximately 12 inches above the bottom 15 of the sludge hopper.

For this configuration, with a 2-inch diameter influent pipe 20 and influent flow rate of about 80 gpm, optimum mixing under these aforementioned conditions was found to occur when the spacing between upper end 30 of influent pipe 20 and inverted cone 28 was 5 inches.

A wide range of dome deflector and inverted cone dimensions have been shown to provide adequate mixing for a variety of sizes of EPT tank and influent flows. For example, inverted cone 28 need be only as wide as the impinging flow which to a good approximation is equal to the inside diameter of upward directed influent pipe 20. Inverted cone 28 preferably has an aspect ratio (height/width) of at least 0.2 to redirect effectively the vertical flow from the influent pipe to radial flow along the underside of dome 26. Cone 28 may be fluted where it meets the underside of dome 26 to avoid an abrupt change in fluid direction and thus smooth fluid flow.

A critical factor is the fluid velocity of influent liquid 24 which for good mixing should impinge on the dome assembly at a velocity between about 2 fps and about 15 fps, with an optimal velocity of about 6 fps (i.e., 2 meters/second).

As flow varies with the square of the pipe ID, an increase in the influent pipe diameter from 2 inches to 4 inches would increase flow about four-fold, e.g., to 320 gpm to maintain a 6 fps influent velocity. As flow also scales linearly with the influent velocity for a given pipe diameter, reducing influent flow velocity to 3 fps would reduce the flow rate by half.

Fluid exiting influent pipe 20 is redirected by dome 26 radially outward along the underside of the dome as discussed above.

The space between lip of the influent pipe and the inverted cone defines a virtual cylinder with the diameter equal to that of the influent pipe and a height equal to the spacing between the pipe and the inverted cone. Since by the conservation of volume all the influent must pass through the sides of this virtual cylinder, the cylinder must have a surface area $A_c$ equal to or greater than the cross sectional area of the influent pipe $A_p$ so as not to impede the flow ($A_c \geq A_p$). The surface area $A_c$ of the cylinder is $2R\Pi H$ where R is the influent pipe inner radius and H is the spacing of the lip of the influent pipe to the inverted cone. This area must be equal to or greater than the cross sectional area of the influent pipe $\Pi R^2$, e.g., $2R\Pi H \geq \Pi R^2$. Therefore, $H=R/2$, and thus the minimum spacing between the lip and the inverted cone is equal to at least one-half the inner radius of the influent pipe.

The fluid stream 24 from influent pipe 20 into tank 12 will slow and dissipate as it progresses towards inverted cone 28. The maximum spacing between the lip of the influent pipe and the inverted cone is determined by the requirement that the upward velocity of the fluid impinging on the inverted cone be at least 4 feet/second so the fluid has sufficient momentum to promote good mixing within the fluid dynamic streams predicted by computer simulations.

To function effectively, the dome generically need be only an upward convexity defining an upward concavity on its underside; it need not be spherical or parabolic. The dome serves two functions: a) to create flow channels sideways and downwards to promote good mixing; and b) to contain the highest velocity flow channels to stay beneath the dome elevation within the tank, allowing the fluid zone in the tank above the dome to be relatively tranquil to minimize movement of sludge flocs into the upper portion of the tank and thus increase the time needed for settling. The diameter of the dome and its specific shape are established by the requirement that the fluid velocity preferably is less than about 1 ft/second at the outer edge of the dome. Higher velocities can push some of the suspended BOD seed particles in the influent into the upper portion of the tank, thus inhibiting coalescence and settling of BOD particles.

Various changes may be made to the structure embodying the principles of the invention. The foregoing embodiments are set forth in an illustrative and not in a limiting sense. The scope of the invention is defined by the claims appended hereto.

What is claimed is:

1. A method for static mixing in a waste water settling tank to increase the percentage of recovery of entrained solids from influent waste water, comprising the steps of:
   a) providing a settling tank having a hopper bottom with sloping sidewalls defining a sludge hopper;
   b) providing a deflector disposed within a space contained in said hopper bottom;
   c) providing an inlet pipe for introduction of said influent waste water into said settling tank, said inlet pipe having a discharge outlet in proximity to an underside of said deflector;
   d) providing an amount of residual waste water in said sludge hopper, said residual waste water containing first entrained solids;
   e) directing a flow of said influent waste water against said underside of said deflector, said influent waste water containing second entrained solids;
   f) passing said influent waste water outward along said underside to an edge of said deflector; and
   g) discharging said influent waste water from said deflector edge into contact with said amount of residual waste water in said sludge hopper to bring said second entrained solids into contact with said first entrained solids, wherein said discharging of said influent waste water is performed at a flow velocity sufficient to cause turbulent mixing of said first and second entrained solids within said hopper bottom.

2. A method in accordance with claim 1 wherein said step of providing an inlet pipe further comprises the steps of:
   a) providing a pump at an end of said inlet pipe;
   b) providing apparatus for controlling said pump to control said flow velocity; and
   c) providing apparatus for adding materials to said influent waste water to adjust pH thereof or to inject flocculants and/or coagulants thereto.

3. A method in accordance with claim 1 wherein said deflector is dome-shaped and is disposed centrally within said space.

4. A method in accordance with claim 3 further comprising a distribution cone centrally disposed within said deflector dome for receiving said influent waste water.

5. A method in accordance with claim 4 wherein said deflector dome and said distribution cone in combination define a deflector assembly.

6. A method in accordance with claim 4 wherein the diameter of said distribution cone is at least equal to the inner diameter of said discharge outlet.

7. A method in accordance with claim 4 wherein said discharge outlet is off-spaced vertically from said distribution cone by a distance equal to at least one-half the radius of said discharge outlet.

8. A method in accordance with claim 7 wherein said inlet pipe is arranged such that said influent waste water discharged from said discharge outlet is directed upwards into said deflector dome against said deflector cone.

9. A method in accordance with claim 7 wherein the diameter of said inlet pipe is between 0.5 and 4 inches, said off-spaced distance is between 0.25 and 10 inches, and the flow rate of said influent waste water is between 60 and 360 gallons per minute.

10. A method in accordance with claim 8 wherein the velocity of said influent waste water directed against said distribution cone is between two feet per second and 15 feet per second.

11. A method in accordance with claim 10 wherein the velocity of said influent waste water directed against said distribution cone is six feet per second.

12. A method in accordance with claim 1 wherein the velocity of said influent waste water in said discharging step is less than two feet per second.

13. A method in accordance with claim 1 wherein said first and second entrained solids comprise BOD particles.

* * * * *